United States Patent
Guzik et al.

[11] Patent Number: 5,397,408
[45] Date of Patent: Mar. 14, 1995

[54] ULTRASONIC WELDING OF METALLIZED PLASTIC

[75] Inventors: Andrzej T. Guzik, Pompano Beach; Stephen D. Hunt, Davie, both of Fla.

[73] Assignee: Motorola, Inc., Schaumburg, Ill.

[21] Appl. No.: 247,372

[22] Filed: May 23, 1994

[51] Int. Cl.6 ............................................. B32B 31/16
[52] U.S. Cl. .................... 156/73.1; 156/221; 156/580.1
[58] Field of Search ............. 156/69, 73.1, 196, 221, 156/580.1; 264/23

[56] References Cited

U.S. PATENT DOCUMENTS

| | | | |
|---|---|---|---|
| 4,558,957 | 12/1985 | Mock et al. | 156/73.1 X |
| 4,954,191 | 9/1990 | Delespaul et al. | 156/69 |
| 4,993,007 | 2/1991 | Meister | 156/73.1 X |
| 5,176,314 | 1/1993 | Akazawa et al. | 229/125.35 |
| 5,288,350 | 2/1994 | Kita | 156/73.1 |
| 5,316,603 | 5/1994 | Akazawa et al. | 156/69 |

OTHER PUBLICATIONS

"Ultrasonic Plastic Assembly—an Introduction" Ian Robinson, Automotive Project Engineer at Lucas Dawe Ultrasonics, Ltd., *Welding Review*, Nov., 1988.

Primary Examiner—David A. Simmons
Assistant Examiner—J. Sells
Attorney, Agent, or Firm—Dale W. Dorinski

[57] ABSTRACT

A method for ultrasonically welding two plastic parts together. One part (30) has a weld joint feature (23) that is covered with a metal layer (27), and the other plastic part (25) has a complimentary weld joint feature. The two parts are joined together by ultrasonically welding the two weld joint features to each other. A force (40) is applied to the first and second plastic parts prior to the step of welding. The force is substantially in excess of that required to cause the two weld joint features to contact each other. This method creates an ultrasonic welded metallized plastic assembly. Each part of the assembly has a weld joint feature, at least one of which was covered with a metal layer prior to welding. Portions of the each of the two weld joint features are deformed to form a plastic weld joint through the metal coating.

9 Claims, 1 Drawing Sheet

ULTRASONIC WELDING OF METALLIZED PLASTIC

TECHNICAL FIELD

This invention relates in general to a method of joining two parts, and more particularly, to ultrasonic welding of plastic parts.

BACKGROUND

Ultrasonic welding allows accurate and precise application of energy to selectively melt or weld the desired portions of a plastic assembly. Ultrasonic assembly is suitable for most thermoplastic materials, and is widely used to weld thermoplastic parts in the automotive, packaging, electronic, and consumer industries. In practice, high-frequency (ultrasonic) mechanical vibrations are transmitted by the ultrasonic welding machine to mating plastic parts. At the joint or interface of the two parts, a combination of applied force and surface and/or intermolecular friction increases the temperature until the melting point of the thermoplastic is reached. The ultrasonic energy is then removed and a molecular bond or weld is produced between the two plastic parts.

An ultrasonic welding system typically contains a high-frequency power supply (usually 20-40 kHz). The high-frequency energy is directed into a horn Which is a bar or a metal section, typically of titanium, aluminum, or hardened steel, dimensioned to be resident at the applied frequency. The horn contacts the workpiece and transmits the mechanical vibrations into it. A fixture or nest supports and aligns the two parts to be welded. It is generally made of aluminum or steel, and is sometimes lined with cast urethane or another material that is resilient.

Proper joint design is essential for optimum welding results. Factors such as the type of material, part geometry, and requirements of the welded joint must be considered with determining the design. A joint should have a small, uniform initial contact area and some means of alignment to concentrate the ultrasonic energy for rapid localized energy dissipation. An energy director, the most commonly used design, consists of a small triangular bead of material on the part surface to be welded. In one type of weld, a sheer, or interference joint is used to obtain a high-strength hermetic seal. During welding, the interfaces melt and telescope together, producing a weld in the shear mode.

Many types of thermoplastic polymers can be welded. Amorphous resins such as polystyrene, acrylonitrile-butadiene-styrene (ABS), polycarbonate, etc., are very energy efficient and are generally preferred for ultrasonic welding. They are characterized by a random molecular arrangement and a broad softening temperature range. This allow the material to flow easily without premature solidification. Resins that have higher levels of crystallinity require higher ultrasonic energy levels because of their highly-ordered molecular structure. Some dissimilar resins can be welded if their glass transition temperatures are similar (typically within about 40° F.). And, they have somewhat similar molecular structures. Typical examples are ABS-to-acrylic, polycarbonate-to-acrylic, and polystyrene-to-polyphenyleneoxide.

Many other factors, such as moisture content, fillers, and mold release agents, affect the ability to ultrasonically weld thermoplastic materials. Optimum welding typically requires that the plastic parts be dried prior to welding. Fillers are known to inhibit ultrasonic welding when levels of filling exceed 30-35%. Above these levels, strong welds cannot be assured because the joint areas contain insufficient fusible material. Also, fillers such as glass and minerals, can be abrasive and cause excessive horn wear at levels above 35%. Mold release agents lower the material's coefficient of friction and adversely affect the weld. Weld surfaces should preferably be cleaned with suitable cleaners to remove any surface contaminants prior to welding.

The conventional wisdom in the art of ultrasonic welding has always indicated that the joint to be welded should be thoroughly cleaned and be free of foreign material. For this reason, it has been difficult and expensive to weld plastic parts that have metal plating on them. Metal plating in the area of the weld joint must be removed in order to assure a proper weld. This requires that plated plastic parts used, for example, as shielded RF shielded housings, must have the platings selectively masked off or removed prior to welding. Clearly it would be an advantageous improvement in the state of the art to be able to weld fully plated plastic parts.

SUMMARY OF THE INVENTION

Briefly, according to the invention, there is provided a method for ultrasonically welding two plastic parts together. One part has a weld joint feature that is covered with a metal layer, and the other plastic part has a complimentary weld joint feature. The two parts are joined together by ultrasonically welding the two weld joint features to each other.

In one embodiment of the invention, a force is applied to the first and second plastic parts prior to the step of joining. The force is substantially in excess of that required to cause the two weld joint features to contact each other.

In an alternate embodiment of the invention, an ultrasonic welded metallized plastic assembly comprises two plastic parts, each part having a weld joint feature. At least one of the weld joint features was covered with a metal layer prior to welding. Portions of the each of the two weld joint features are deformed to form a weld joint between the two weld joint features.

DETAILED DESCRIPTION OF THE PREFERRED EMBODIMENT

Figure 1:
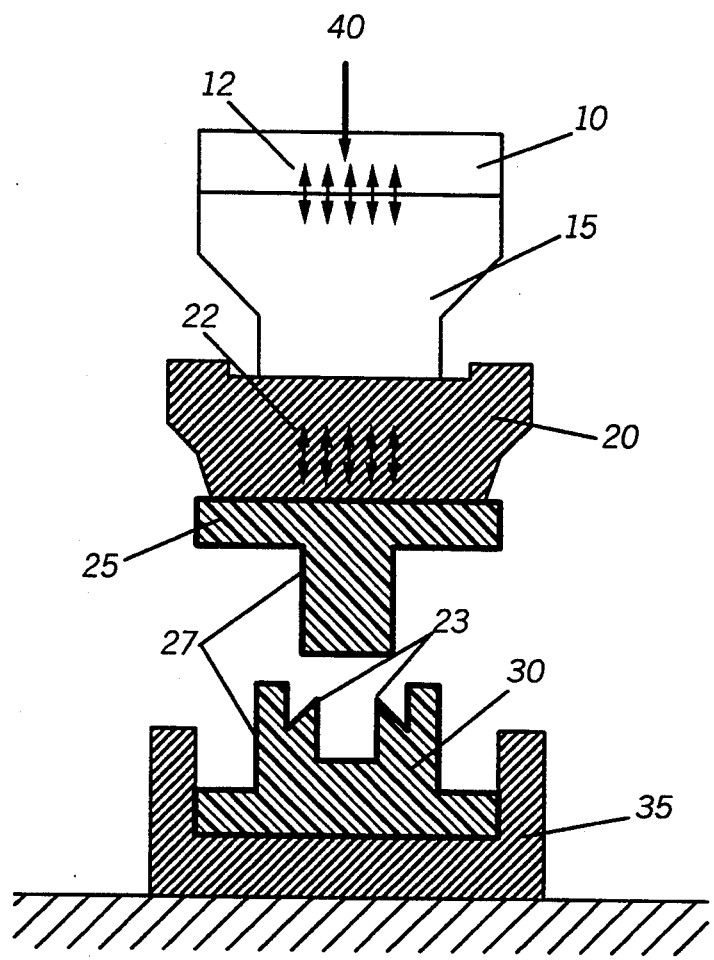
FIG. 1 is a schematic representation of ultrasonic welding in accordance with the invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, ultrasonic welding is conventionally carried out as follows: 60 Hz alternating current (AC) line power is transformed to high (ultrasonic) frequency (20-40 kHz) AC power, which in turn is converted to mechanical vibrations of similar ultrasonic frequency through a piezoelectric transducer.

These transformations take place in the portion of an ultrasonic welding machine commonly referred to as the generator/converter 10. The mechanical vibrations 12 are transmitted through the booster 15 and weld horn 20 to the plastic parts to be joined 25, 30. This assembly is collectively called the 'stack'. The geometries of the booster 15 and horn 20 define the degree of vibrational amplification which occurs in the stack, thereby defining the vibration 22 applied to the plastic parts 25, 30. The amplitude of vibration largely defines the amount of ultrasonic energy available. The weld horn 20 is custom-designed to mate with the first plastic part 25. The second plastic part 30 is constrained by a custom-designed fixture 35, which also serves to prevent its deformation. The mechanical vibrations 22 cause intermolecular vibration, thus frictional heat, within the plastic parts 25, 30. Through proper weld joint feature design, the intermolecular friction can be maximized locally, thereby selectively melting portions of the plastic parts, thus welding them together. The entire process is conducted under the application of a mechanical force 40 applied in a direction to cause the first plastic part 25 to touch the second plastic part 30, thus ensuring their intimate contact. This force is applied in two stages, one prior to the application of ultrasonic vibration 22, which is called the trigger force, and the second during the application of ultrasonic vibration, called the weld force. The trigger force is substantially in excess of that required to cause the two weld joint features to contact each other, thereby ensuring simultaneous melt initiation along the entire weld interface. Once this force is applied, the introduction of ultrasonic energy begins. The weld force, which is not necessarily identical to the trigger force, defines, to a large extent, the rate at which the two parts are joined.

In one embodiment of the invention, the first and second plastic parts 25, 30 were comprised of injection molded test specimens. These test specimens have been referred to as modified I-Beams, and are distinctly different from the standard test specimens being developed by the American Welding Society G-1 Subcommittee on the Joining of Plastics and Composites in that they have an acute portion 23 on at least one area of at least one of the plastic parts. The first and second plastic parts were injection molded from polycarbonate, a thermoplastic material, and then covered with a coating 27 of copper and nickel via an electroless plating process. The plating thickness of the copper was measured to be approximately 1 $\mu$m thick. The plating thickness of the nickel was measured to be approximately 0.25 $\mu$m thick. Metal coatings in the range of 0.1 $\mu$m to 5 $\mu$m will be found to be useful, with the exact thickness being a function of the design requirements and the metal selected. However, the coating must not be formed too heavily, or it will be too strong and will not be overcome by the welding forces, thus a good weld joint will not be achieved. Other equivalent means of plating the plastic parts could also be used with success, such as vacuum depositing a coating (sputtering, evaporation, etc.), electroplating, flame spraying, coating with metallized paint, etc. In addition, other metals, such as aluminum, chrome, tin, or titanium may also be used. In contrast to the conventional art, the metal coating 27 is formed over the entire part, and is not selectively removed or masked in the area or the weld joint feature. Prior to welding, the first plastic part 25 was oriented relative to the second plastic part 30 as shown. Appropriate fixturing 35 was used such that the two plastic parts' complementary weld joint features were appropriately aligned. In this representation of the embodiment, the second plastic part 30 contained a weld joint feature having an acute portion 23. The configuration of the weld joint features could also have been reversed between the two plastic parts. The acute portion 23 was found to be useful in creating a weak spot in the metal coating during the welding process. This weak spot aids the welding process by allowing the plastic to flow more readily and form a strong weld to the other plastic part.

Figure 2:
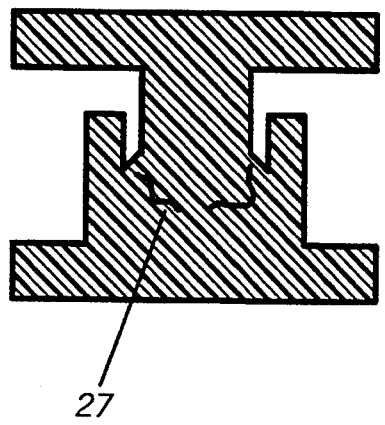
FIG. 2. is a cross-sectional view of two metallized plastic parts after welding in accordance with the invention.

A trigger force of 245N was applied to the first plastic part. The amplitude of vibration was 60 $\mu$m, and the weld force was set at 267N. The parts were held together for 0.5 seconds under the application of the selected weld force after the cessation of the ultrasonic energy. Application of these process conditions allowed the complementary weld joint features in the two plastic parts to be locally heated in excess of polycarbonate's melting point. The molten plastic deformed, then resolidified into the weld joint after removal of the ultrasonic energy. Referring now to FIG. 2, after welding, the metal plating 27 is disrupted and has become dispersed throughout the weld joint, allowing the two plastic parts to flow together. Once complete, the process yielded a welded, metallized plastic assembly.

Figure 3:
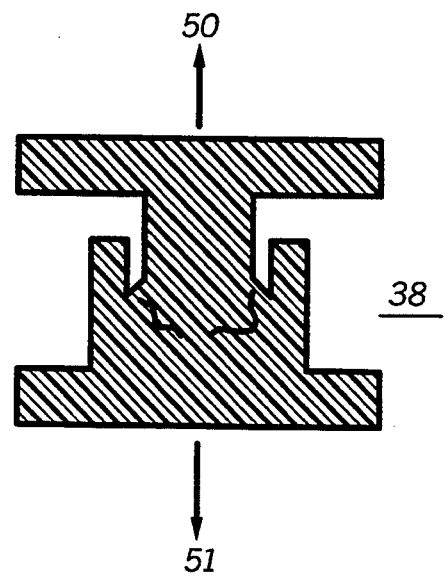
FIG. 3 is an illustration of the test procedure used to determine the effectiveness of the weld joint.

Referring now to FIG. 3, the metallized plastic assembly 38 was placed in a fixture on an Instron Universal Testing machine and a force 50, 51 was applied as shown. The force was increased until it caused the two welded parts to be ultimately pulled apart, creating a failure. This testing was conducted in accordance with standard test procedures being developed by the American Welding Society G-1 Subcommittee on the Joining of Plastics and Composites. In short, these test procedures involve the determination of the force required to induce failure in standard welded test specimens as compared to the force required to induce failure in a molded, one-piece test specimen of identical geometry (the control specimen). The results of testing conducted with a variety of plastic parts are as follows:

| Material | Average Strength |
| --- | --- |
| One-piece, molded polycarbonate control | 6352 N |
| Welded, unplated polycarbonate | 6325 N |
| Welded, plated polycarbonate | 6280 N |

The above results indicate that a metallized plastic assembly can be effectively created by joining two metal coated plastic parts using ultrasonic welding. An effective weld, equivalent to that obtained with unplated plastic, can be obtained on plastic parts that are completely plated with metal in the weld joint areas. While the preferred embodiments of the invention have been illustrated and described, it will be clear that the invention is not so limited. For example, differing trigger forces, metal platings, plastic compositions and weld joint configurations can be used. These and other modifications, changes, variations, substitutions and equivalents will occur to those skilled in the art without departing from the spirit and scope of the present invention as defined by the appended claims.

What is claimed is:

1. A method for ultrasonic welding, comprising the steps of:

providing first and second plastic parts, the first plastic part having a first weld joint feature that is covered with a metal coating (layer) and the second plastic part having a second (complimentary) weld joint feature; and joining the first (and second plastic parts together by ultrasonically welding the two weld joint features to each other) plastic part to the second plastic part by placing at least a portion of the first weld joint feature metal coating in direct contact with the second weld joint feature, and ultrasonically welding through the metal coating to weld the first weld joint feature to the second weld joint feature.

2. The method as described in claim 1, wherein the first (plastic part) weld joint feature has (an acute) a projection having a pointed portion.

3. The method as described in claim 1, wherein the second weld joint feature is covered with a metal coating, (plastic part has a metal layer covering the complimentary weld joint feature.)

4. The method as described in claim 3, wherein the second (plastic part) weld joint feature has (an acute) a projection having a pointed portion.

5. The method as described in claim 1, further comprising a step of applying a force to the first and second plastic parts after the step of providing and prior to the step of joining.

6. An ultrasonic welding method, comprising the steps off providing first and second plastic parts, the first plastic part having a first weld joint feature that is covered with a metal coating (layer) and the second plastic part having a second (complimentary) weld joint feature;

aligning the first weld joint feature with the second weld joint feature so that at least a portion of the first weld joint feature metal Coating is in contact with the second weld joint feature:

applying a force to the first and second plastic parts substantially in excess of that required to cause the two weld joint features to contact each other; and joining the first and second plastic parts together by ultrasonically welding through the metal coating to fuse the two weld joint features to each other.

7. The method as described in claim 6, wherein the first (plastic part) weld joint feature has (an acute) a projection having a pointed portion.

8. The method as described in claim 6, wherein the second weld joint feature is covered with a metal coating, (plastic part has a metal layer covering the complimentary weld joint feature.)

9. The method as described in claim 8, wherein the second (plastic part) weld joint feature has (an acute) a projection having a pointed portion.

* * * * *

UNITED STATES PATENT AND TRADEMARK OFFICE
CERTIFICATE OF CORRECTION

PATENT NO. : 5,397,408
DATED : March 14, 1995
INVENTOR(S) : Guzik, et al.

It is certified that error appears in the above-identified patent and that said Letters Patent is hereby corrected as shown below:

Column 6, claim 6, line 2, after "steps off" insert --:--.

-- : --.

Column 6, claim 6, line 10, delete "Coating" and insert therefor -- coating --.

Signed and Sealed this

Twentieth Day of June, 1995

Attest:

BRUCE LEHMAN

Attesting Officer                Commissioner of Patents and Trademarks